UNITED STATES PATENT OFFICE.

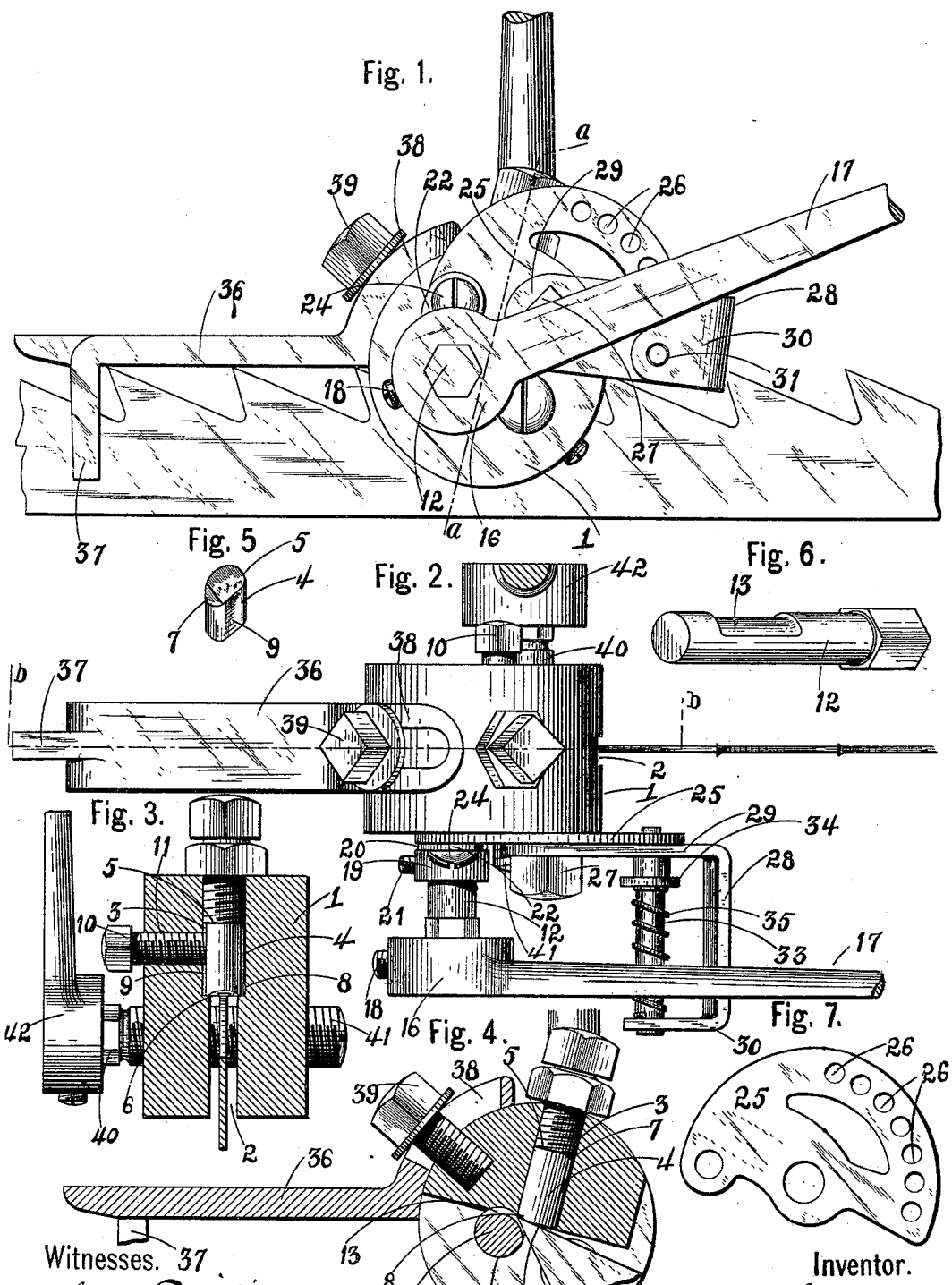

DAVID J. CROWELL, OF DUBOIS, PENNSYLVANIA.

SAW-SWAGE.

SPECIFICATION forming part of Letters Patent No. 642,896, dated February 6, 1900.

Application filed June 19, 1897. Serial No. 641,404. (No model.)

*To all whom it may concern:*

Be it known that I, DAVID J. CROWELL, a citizen of the United States, residing at Dubois, in the county of Clearfield and State of Pennsylvania, have invented certain new and useful Improvements in Saw-Swages; and I do hereby declare the following to be a full, clear, and exact description of the invention, such as will enable others skilled in the art to which it appertains to make and use the same.

My invention relates to an improved saw-swaging device in which the teeth are inserted between the opposed surfaces of an anvil and an eccentric swaging-die and drawn out by the partial rotation of said eccentric swaging-die; and the object of the invention is to provide a simple and conveniently-operated device of this type having an adjusting device for regulating the extent of the swage.

The invention also relates to certain other details of construction, all of which will be fully and clearly hereinafter described and claimed, reference being had to the accompanying drawings, in which—

Figure 1 represents a side elevation of my improved device. Fig. 2 is a top plan view. Fig. 3 is a section on or about line *a a*, Fig. 1, the stop mechanism being removed. Fig. 4 is a section on or about line *b b*, Fig. 2. Fig. 5 is a detached perspective view of the anvil. Fig. 6 is a detached perspective view of the die. Fig. 7 is a detached view of the gage-plate.

In referring to the drawings for the details of construction like numerals designate like parts.

1 designates the body portion or anvil-supporting block, the lower portion of which is provided with a vertical slot 2, extending upward from its lower surface and terminating on or about a substantially horizontal line through the center, and a screw-threaded opening or aperture 3, extending upward from the slot 2, through the upper portion of the block.

The anvil device 4 is formed of a short portion of suitable metal, preferably steel, having flat ends 5 and 6, which are beveled to form the edges 7 and 8, and is seated or supported in the lower part of the aperture 3. As both ends of the anvil are similar it can be reversed when worn at one end to bring the opposite end into swaging position, thus insuring double life to the anvil. One side of the anvil is flattened, as indicated by the numeral 9, against which the end of the set-screw 10 or other locking device, passed through an opening 11 in the block 1, is forced to rigidly hold the anvil in its adjusted position.

The swaging-die 12 is formed of steel or other suitable metal and has a hollow recess or depression 13, forming an eccentric swaging edge, between which and the opposed beveled edge 8 of the anvil the teeth of the saw are swaged. The die is rotatably mounted in a transverse opening or hole 14 in the block 1, and has an outer hexagonal or other shaped end upon which the corresponding bored lower end 16 of the operating-lever 17 is secured by the set-screw 18.

19 represents a collar loosely mounted on the inner end of the die and having a circumferential groove 20, through a hole in which passes a set-screw 21 to clamp said collar and die together.

22 is a dog having a curved or concaved lower edge to engage with the groove 20 in the collar 19 and prevent longitudinal movement of the die. This dog is clamped to the anvil-block by a set-screw 24, which has bearing in a screw-threaded hole in said anvil-block 1, and also serves to clamp in position the segmental gage-plate 25, having stop-pin-adjustment holes 26. This segmental gage-plate has a pivot bearing on a bolt 27, having bearing in the anvil-block. On this bolt 27 is pivotally mounted the back-stop 28 for limiting the rearward movement of and affording a rest for the die-operating lever, said back-stop having a depending arm 29, provided at its lower end with a hole through which said bolt 27 passes and on which bolt it has pivotal or rocking bearing, and a rectangular upper portion 30, having bores, slots, or holes 31, constituting bearings for the spring-encircled stop adjusting and holding pin 33, whose inner end engages, as the back-stop is adjusted, with the hole in the segmental gage-plate at the time being opposite said pin 33.

34 represents a sleeve or boss mounted on the pin 33, adjacent to its inner end, but within the back-stop, by means of which said spring-pin 33 may be drawn out of engagement with the segmental gage-plate when it is desired to adjust the position of the back-stop to change the depth of swage on the saw-teeth. When tension on said sleeve or boss 34 is released, the spiral spring 35, one end of which is connected with said sleeve or boss and the other end with the outer arm of the back-stop, forces the pin 33 into engagement with the gage-plate, and thereby holds said back-stop rigidly and securely in adjusted position.

36 represents a saw-guide, which at its outer end has a branched portion 37, depending downwardly therefrom at an angle to guide and retain the saw in appropriate position while being swaged. This guide is provided with a curved longitudinally-slotted rear portion 38 to afford means for adjustment to suit different saws, and is secured in its adjusted position by a clamping-bolt 39, passed through said slot into the anvil-block 1.

The saw is rigidly held in the vertical slot 2 in the block 1 during the swaging operation by clamping devices, preferably the clamping-screws 40 and 41, which pass through horizontal screw-threaded openings in the lower branched portion of the block 1 and contact with the opposite sides of the saw, the screw 40 being provided with an operating-lever 42, detachably mounted upon its outer end.

To secure the saw in swaging position, it is inserted in the slot 2 between the ends of the opposed clamping-screws 40 and 41 and the lever is turned, screwing the screw 40 inwardly and pressing its end against the surface of the saw. By this construction I provide an adjustable and positive device for limiting the operating movement of the controlling-lever of the die, and thereby regulate the extent of the movement of the swaging-die relatively to the saw-teeth. The material of the teeth is drawn out instead of being driven back. Consequently the teeth are longer after swaging by my device than before. The swaging by my device is done entirely from the face of the teeth, leaving their backs preferably straight. The construction of the anvil described by rendering it reversible and by forming it with straight ends, so that it will snugly fit and afford an even bearing-surface for the edge of the tooth under treatment, increases its life and the ease of operation of the device.

It will be noticed that the adjustment of the back-stop whereby varied depth of swaging can be secured can be very readily and speedily accomplished, all that is necessary to secure such result being to draw the spring-pin out of engagement with the segmental gage-plate, turning of the back-stop on its pivot in the appropriate direction to the desired position, and then release the spring-pin to permit it to enter the opposed spring in the segmental gage-plate.

Having thus described my invention, what I claim is—

1. A saw-swage consisting of an anvil-block, a cylindrical flat-ended anvil removably clamped therein, a cylindrical die having a longitudinally-recessed face and having rocking bearing in said anvil-block, an operative handle removably connected with said die, a segmental gage-plate mounted on said anvil-block and provided with an arc series of perforations, a die-operating lever back-stop having rocking bearing on said anvil-block and a spring-pin carried by said back-stop and adapted to engage the perforated gage-plate and lock said back-stop in adjusted position, substantially as and for the purpose set forth.

2. A saw-swage consisting of an anvil-block having a slotted under portion, a cylindrical flat-ended anvil removably clamped in a vertical slot in said block, a supporting-handle, or hand-grasp, mounted on a bearing extending from said block, a cylindrical die having a recessed face and having rocking bearing in said block, an operative lever removably clamped to said die, a back-stop having pivotal bearing on said block and adapted to receive the impact of said die-operating lever in its swaging operation, a spring-pin carried by said back-stop and a perforated gage-plate mounted on said block and adapted to receive said spring-pin for the purpose of locking said back-stop in adjusted position, substantially as set forth.

3. A saw-swage consisting of an anvil-block, an anvil seated therein, a die having rocking bearing in said block, a die-actuating lever and a hand-grasp for holding the swage in position, a perforated gage-plate mounted on said block, a back-stop having adjustable bearing on said block, and a spring-pin carried by said stop and adapted to engage with the perforated gage-plate, substantially as and for the purpose set forth.

4. A saw-swage consisting of an anvil-block, a flat-ended anvil removably fastened therein, a die having an eccentric swaging-face and having rocking bearing in said anvil-block, an operating-lever removably connected with said die, a segmental gage-plate mounted on said anvil-block and provided with a series of perforations, a device for limiting the movement of the die-operating lever and having rocking bearing on said anvil-block and a spring-pin carried by said device and adapted to engage the perforated gage-plate and lock said device in its adjusted position, substantially as and for the purpose set forth.

5. A saw-swage consisting of an anvil-block having a saw-receiving slot, an anvil removably fastened in an aperture in said block, a die having a swaging-face and having rocking bearing in said block, an operating-lever attached to said die, a device for limiting the movement of said lever having pivotal bearing on said block and adapted to receive the impact of said die-operating lever in its swaging operation, a spring-pin carried by said limiting device and a perforated gage-plate mounted on said block and adapted to receive said spring-pin for the purpose of locking said limiting device in adjusted position, substantially as set forth.

In testimony whereof I affix my signature in presence of two witnesses.

DAVID J. CROWELL.

Witnesses:
HERBERT A. MOORE,
D. S. HERRON.